US009443033B2

(12) United States Patent
Lambert et al.

(10) Patent No.: US 9,443,033 B2
(45) Date of Patent: Sep. 13, 2016

(54) SYSTEMS, METHODS, AND COMPUTER PROGRAM PRODUCTS FOR DATA INTEGRATION AND DATA MAPPING

(71) Applicant: Blackbaud, Inc., Charleston, SC (US)

(72) Inventors: Benjamin Adam Lambert, Mt. Pleasant, SC (US); Ellyn Ferrante LaVecchia, Medford, SC (US); Jack Arthur Nathan, Jr., Mt. Pleasant, SC (US); Ari Parnes, Cambridge, MA (US); Charles L. Longfield, Cambridge, MA (US); Raymond A. Minnis, Charleston, SC (US); Todd A. Yellin, Arlington, MA (US)

(73) Assignee: BLACKBAUD, INC., Charleston, SC (US)

( * ) Notice: Subject to any disclaimer, the term of this patent is extended or adjusted under 35 U.S.C. 154(b) by 143 days.

(21) Appl. No.: 13/782,629

(22) Filed: Mar. 1, 2013

(65) Prior Publication Data

US 2013/0311498 A1    Nov. 21, 2013

Related U.S. Application Data

(60) Provisional application No. 61/643,237, filed on May 5, 2012.

(51) Int. Cl.
*G06F 17/30* (2006.01)

(52) U.S. Cl.
CPC ... *G06F 17/30943* (2013.01); *G06F 17/30303* (2013.01)

(58) Field of Classification Search
CPC .................... G06K 9/00617; G06F 17/30185; G06F 7/02; G06F 17/30002
USPC .................................................. 707/758, 780
See application file for complete search history.

(56) References Cited

U.S. PATENT DOCUMENTS

| | | | | |
|---|---|---|---|---|
| 5,991,758 A | * | 11/1999 | Ellard ............... | G06F 17/30321 |
| 7,289,997 B1 | * | 10/2007 | Kita et al. | |
| 7,376,680 B1 | * | 5/2008 | Kettler ............. | G06F 17/30303 |
| 7,685,093 B1 | * | 3/2010 | Adams ............. | G06F 17/30389 |
| | | | | 707/999.001 |
| 8,417,715 B1 | * | 4/2013 | Bruckhaus et al. | .......... 707/758 |
| 8,498,982 B1 | * | 7/2013 | Cope ................ | G06F 17/30908 |
| | | | | 707/694 |
| 8,682,866 B1 | * | 3/2014 | McDill et al. ...... | ......... 707/692 |
| 2004/0133561 A1 | * | 7/2004 | Burke ............... | ............. 707/3 |
| 2005/0097150 A1 | * | 5/2005 | McKeon ........... | G06F 17/30592 |
| 2007/0162507 A1 | * | 7/2007 | McGovern et al. | ....... 707/104.1 |
| 2007/0276844 A1 | * | 11/2007 | Segal ............... | G06F 17/30495 |
| 2007/0276858 A1 | * | 11/2007 | Cushman .......... | G06F 17/30303 |
| 2008/0005106 A1 | * | 1/2008 | Schumacher ..... | G06F 17/30489 |
| 2008/0154934 A1 | * | 6/2008 | Lau ................... | G06F 12/0866 |

(Continued)

*Primary Examiner* — Hanh Thai
(74) *Attorney, Agent, or Firm* — Moore & Van Allen PLLC; Henry B. Ward, III

(57) ABSTRACT

The invention is directed to systems, methods and computer program products for data integration. An exemplary method includes receiving a data record at a system, comparing the received data record with an existing data record, determining a level of match between the received data record and the existing data record, and in response to determining the level of match is equal to or greater than a first threshold level and is less than or equal to a second threshold level, processing the data, wherein the second threshold level is greater is than the first threshold level. Additionally, the exemplary method includes mapping the received data record to a database accessible to the system.

19 Claims, 7 Drawing Sheets

(56) References Cited

U.S. PATENT DOCUMENTS

| | | | |
|---|---|---|---|
| 2008/0243885 A1* | 10/2008 | Harger | G06F 17/30289 |
| 2010/0153184 A1* | 6/2010 | Caffrey et al. | 705/10 |
| 2010/0191714 A1* | 7/2010 | Wen et al. | 707/706 |
| 2011/0010346 A1* | 1/2011 | Goldenberg | G06F 17/30545 707/690 |
| 2012/0059853 A1* | 3/2012 | Jagota | 707/780 |
| 2013/0185295 A1* | 7/2013 | Matsuo | G06Q 30/06 707/735 |
| 2013/0204864 A1* | 8/2013 | Matsuo | G06Q 30/02 707/722 |

* cited by examiner

FIG. 3

POSSIBLE DUPLICATE MATCHES FOR JANE LOUISE DOE (BATCH ROW 3) — REVISED

JANE LOUISE DOE (ROW 3)
BATCH 123 CREATED ON 11-21-2011 — 440

⊕ ADD THIS AS A NEW RECORD — 440

LOOKUP ID:
NAME:
- JANE
- LOUISE
- DOE

DATE OF BIRTH:
- 12-31-1975

ADDRESS:
- 1414 WIDE ANDERSON HIGHWAY
- APARTMENT 21B
- CHARLESTON
- SC
- 29407

EMAIL:
- JANE.DOE@NET.COM

PHONE:
- 803-722-1234

BEST POSSIBLE MATCH (83%)
CREATED 10-8-2005; LAST UPDATED 11-1-2011

✓ CONFIRM THIS RECORD AS A MATCH — 450

LOOKUP ID: 29320-11
CONSTITUENT NAME:
JANEY
DOE

DATE OF BIRTH:

PRIMARY ADDRESS:
1414 WIDE ANDERSON HIGHWAY
CHARLESTON
SC
29607

PRIMARY EMAIL:
JANE_D23@COMCAST.NET

PRIMARY PHONE:
843-555-1212

2 POTENTIAL MATCHES FOUND

83% JANEY DOE
LOOKUP ID 29320-21 — 420
1414 JAMAICA DRIVE
CHARLESTON SC 29607

80% JANET DOE
LOOKUP ID 97235
123 MAIN STREET
CHARLESTON SC 29407 — 430

SKIP — 460    CANCEL

? HELP — 470

*FIG. 4*

POSSIBLE DUPLICATE MATCHES FOR JANE LOUISE DOE (BATCH ROW 3)     REVISED

JANE LOUISE DOE (ROW 3) — 510
BATCH 123 CREATED ON 11-21-2011
⊕ ADD THIS AS A NEW RECORD
LOOKUP ID:
NAME:   520
JANE
LOUISE
DOE
DATE OF BIRTH:
12-31-1975
ADDRESS:
1414 WIDE ANDERSON HIGHWAY
APARTMENT 21B
CHARLESTON
SC
29407
EMAIL:     UNDO
JANE.DOE@NET.COM
PHONE:     UNDO
803-722-1234

💡 TIPS

YOU HAVE CHOSEN TO CREATE A NEW
CONSTITUENT RECORD.

YOU CAN GO BACK TO BROWSING POSSIBLE
MATCHES AT ANY TIME.

530

550

540

☑ AUTOMATICALLY GO TO THE NEXT
DUPLICATE EXCEPTION

[ SKIP ]    [ CANCEL ]

? HELP

POSSIBLE DUPLICATE MATCHES FOR JANE LOUISE DOE      REVISED

JANE LOUISE DOE (ROW 3)
BATCH 123 CREATED ON 11-21-2011

| | 660 | 670 | 680 |
|---|---|---|---|
| LOOKUP ID: 29320-11 | | | |
| NAME: | ADD AS AN ALIAS | IGNORE | REPLACE |
| ■ JANE | 610 | IGNORE | REPLACE |
| ■ LOUISE | | IGNORE | ADD |
| ■ DOE | 630 | 640 → | 620 |
| DATE OF BIRTH: | | IGNORE | REPLACE |
| ■ 12-31-1975 | | | |
| ADDRESS: ADD AS SECONDARY | | IGNORE | ADD |
| 1414 WIDE ANDERSON HIGHWAY | | | |
| APARTMENT 21B | | | |
| CHARLESTON | | | |
| SC | | | |
| ■ 29407 | | | |
| EMAIL: ADD AS SECONDARY | | IGNORE | REPLACE |
| ■ JANE.DOE@NET.COM | | | |
| PHONE: ADD AS SECONDARY | | IGNORE | REPLACE |
| ■ 803-722-1234 | 650 | | |

UPDATING JANEY DOE
CREATED 10-8-2005; LAST UPDATED: 11-1-2011

▨ THIS RECORD IS NOT A MATCH

LOOKUP ID: 29320-11
CONSTITUENT NAME:
JANEY
           690
DOE
DATE OF BIRTH:

PRIMARY ADDRESS:
1414 WIDE ANDERSON HIGHWAY
CHARLESTON
SC
29607

PRIMARY EMAIL:
JANE.D23@COMCAST.NET
PRIMARY PHONE:
843-555-1212

💡 TIPS

BEFORE YOU SAVE YOU CAN USE THE "IGNORE","ADD-->", AND "UPDATE-->" LINKS ON THE LEFT TO CHOOSE HOW TO UPDATE THE MATCHING CONSTITUENT RECORD.

IF YOU DECIDE THIS RECORD IS NOT A MATCH, YOU CAN GO BACK TO BROWSING POSSIBLE MATCHES AT ANY TIME.

? HELP

☑ AUTOMATICALLY GO TO THE NEXT DUPLICATE EXCEPTION

[SKIP]    [CANCEL]

| POSSIBLE DUPLICATE MATCHES FOR JANE LOUISE DOE (BATCH ROW 3) | | REVISED |
|---|---|---|
| JANE LOUISE DOE (ROW 3)<br>BATCH 123 CREATED ON 11-21-2011<br>710 | 720 | UPDATING JANEY DOE<br>CREATED 10-8-2005; LAST UPDATED: 11-1-2011<br>▨ THIS RECORD IS NOT A MATCH ⓘ | 💡 TIPS |
| LOOKUP ID: 29320-11<br>NAME: ADDING AS AN ALIAS | UNDO | LOOKUP ID: 29320-11<br>CONSTITUENT NAME:<br>JANEY<br><br>DOE | BEFORE YOU SAVE YOU CAN USE THE "IGNORE", "ADD-->", AND "UPDATE-->" LINKS ON THE LEFT TO CHOOSE HOW TO UPDATE THE MATCHING CONSTITUENT RECORD. |
| ▪ JANE<br>▪ LOUISE<br>▪ DOE | | | |
| DATE OF BIRTH:<br>12-31-1975 | UNDO | DATE OF BIRTH:<br>12-31-1975 ⓘ | IF YOU DECIDE THIS RECORD IS NOT A MATCH, YOU CAN GO BACK TO BROWSING POSSIBLE MATCHES AT ANY TIME. |
| ADDRESS:<br>1414 WIDE ANDERSON HIGHWAY<br>A̶P̶A̶R̶T̶M̶E̶N̶T̶ ̶2̶1̶B̶ 730<br>CHARLESTON<br>SC<br>2̶9̶4̶0̶7̶ | | PRIMARY ADDRESS:<br>1414 WIDE ANDERSON HIGHWAY<br><br>CHARLESTON<br>SC<br>29407 ⓘ | |
| EMAIL: ADDING AS SECONDARY<br>JANE.DOE@NET.COM | UNDO | PRIMARY EMAIL:<br>JANE.D23@COMCAST.NET | |
| PHONE: ADDING AS SECONDARY<br>803-722-1234 | UNDO | PRIMARY PHONE:<br>843-555-1212 ⓘ | ☑ AUTOMATICALLY GO TO THE NEXT DUPLICATE EXCEPTION |
| ❓ HELP | | | SKIP ⬜ CANCEL |

FIG. 7

SYSTEMS, METHODS, AND COMPUTER PROGRAM PRODUCTS FOR DATA INTEGRATION AND DATA MAPPING

BACKGROUND

Organizations must frequently migrate or import data. For instance, when an organization undergoes a technology refresh or otherwise installs and implements a new software application or database, the organization may have to migrate its existing data into the new software application, database, or system. Organizations may also acquire new collections of data, e.g., databases of prospective new customers or contacts. The format of the data to be imported or migrated may have a different file format from what is ultimately needed or compatible with the target system. Additionally, when importing or migrating data, organizations want to prevent creating duplicate records for the same customer or contact. As such, organizations are in need of a system and method for managing such data.

BRIEF SUMMARY

Embodiments of the invention are directed to systems, methods and computer program products for performing data integration. In some embodiments, an exemplary data integration method comprises: receiving a data record at a system; comparing the received data record with an existing data record; determining a level of match between the received data record and the existing data record; and in response to determining the level of match is equal to or greater than a first threshold level and is less than or equal to a second threshold level, processing the received data record, wherein the second threshold level is greater is than the first threshold level.

In some embodiments, the received data record comprises data associated with at least one field.

In some embodiments, the method further comprises in response to determining the level of match is not equal to or greater than a first threshold level, creating a new data record based on the received data record.

In some embodiments, the method further comprises in response to determining the level of match is not less than or equal to the second threshold level, determining the received data record and the existing data record are associated with the same person or entity.

In some embodiments, the processing step comprises at least one of: updating the existing data record with data comprised in the received data record, retaining the existing data record without updating the existing data record with data comprised in the received data record, or integrating the received data record into a database comprising the existing data record without updating the existing data record with data comprised in the received data record.

In some embodiments, the updating step comprises: determining whether the received data record comprises data associated with a field comprised in the existing data record; and in response to determining the received data record comprises data associated with a field comprised in the existing data record, updating the existing data record with data comprised in the received data record, or appending as secondary data into the existing data record, data comprised in the received data record.

In some embodiments, the processing step comprises: determining whether the received data record comprises data associated with a field not comprised in the existing data record; and in response to determining the received data record comprises data associated with a field not comprised in the existing data record, integrating, into the existing data record, data associated with the field not comprised in the existing data record.

In some embodiments, the processing step comprises: comparing a field associated with the received data record with a field associated with the existing data record; and for data associated with each field, performing, based at least partially on at least one rule associated with each field, at least one of: updating data comprised in the existing data record with data comprised in the received data record, retaining the data comprised in the existing data record without updating the data comprised in the existing data record with the data comprised in the received data record, integrating the data comprised in the received data record into the existing data record without erasing the data comprised in the existing data record, or appending as secondary data into the existing data record, data comprised in the received data record.

In some embodiments, the determining whether the received data record and the existing data record are associated with the same person or entity further comprises at least one of: determining whether a first name in the received data record matches a first name in the existing data record, determining whether a first name in the received data record matches a nickname associated with the first name in the existing data record, or determining whether a first name in the received data record matches an alternate first name in the existing data record, wherein the alternate first name is similar to or analogous to, but not the same as, the first name.

In some embodiments, the determining whether the received data record and the existing data record are associated with the same person or entity further comprises: determining whether a last name in the received data record matches a last name in the existing data record, and in response to determining the last name in the received data record does not match the last name in the existing data record, determining whether a person associated with the existing data record has experienced a life-changing event, wherein the life-changing event caused a change to the person's last name.

In some embodiments, a user of the system determines at least one of the first threshold or the second threshold based at least partially on at least one of a characteristic of the received data record, a characteristic of the existing data record, or an attribute (e.g., a processing capacity) of the system.

In some embodiments, a recording format associated with the received data record is different from a recording format associated with the existing data record.

In some embodiments, the method further comprises prior to performing the comparing step, processing the received data record such that the recording format associated with the received data record is substantially compatible with the recording format associated with the existing data record.

In some embodiments, the method further comprises enabling a user to define at least one rule to perform at least one of the comparing, determining, or processing steps.

In some embodiments, the method further comprises reading a header associated with the received data record, wherein the header comprises information regarding at least one of a data type associated with the received data record or at least one instruction regarding mapping the received data record.

In some embodiments, the method further comprises mapping the received data record to a database based on the reading step.

In some embodiments, the method further comprises determining a source associated with the received data record; accessing a list of sources to determine whether the system previously received a data record from the source; and in response to determining the system previously received a data record from the source, retrieving at least one mapping instruction from a database accessible to the system.

In some embodiments, the determining a source associated with the received data record comprises determining a source associated with the received data record based at least partially on reading a header associated with the received data record, wherein the header comprises information regarding at least one of a data type associated with the received data record or at least one instruction regarding mapping the received data record.

In some embodiments, an exemplary system for performing data integration comprises: a memory; a processor; a module stored in the memory, executable by the processor, and configured to: receive a data record at the system; compare the received data record with an existing data record; determine a level of match between the received data record and the existing data record; and in response to determining the level of match is equal to or greater than a first threshold level and is less than or equal to a second threshold level, process the received data record, wherein the second threshold level is greater is than the first threshold level.

In some embodiments, an exemplary computer program product for performing data integration comprises a non-transitory computer-readable medium comprising code configured to: receive a data record at a system; compare the received data record with an existing data record; determine a level of match between the received data record and the existing data record; and in response to determining the level of match is equal to or greater than a first threshold level and is less than or equal to a second threshold level, process the received data record, wherein the second threshold level is greater is than the first threshold level.

BRIEF DESCRIPTION OF THE DRAWINGS

Figure 1:
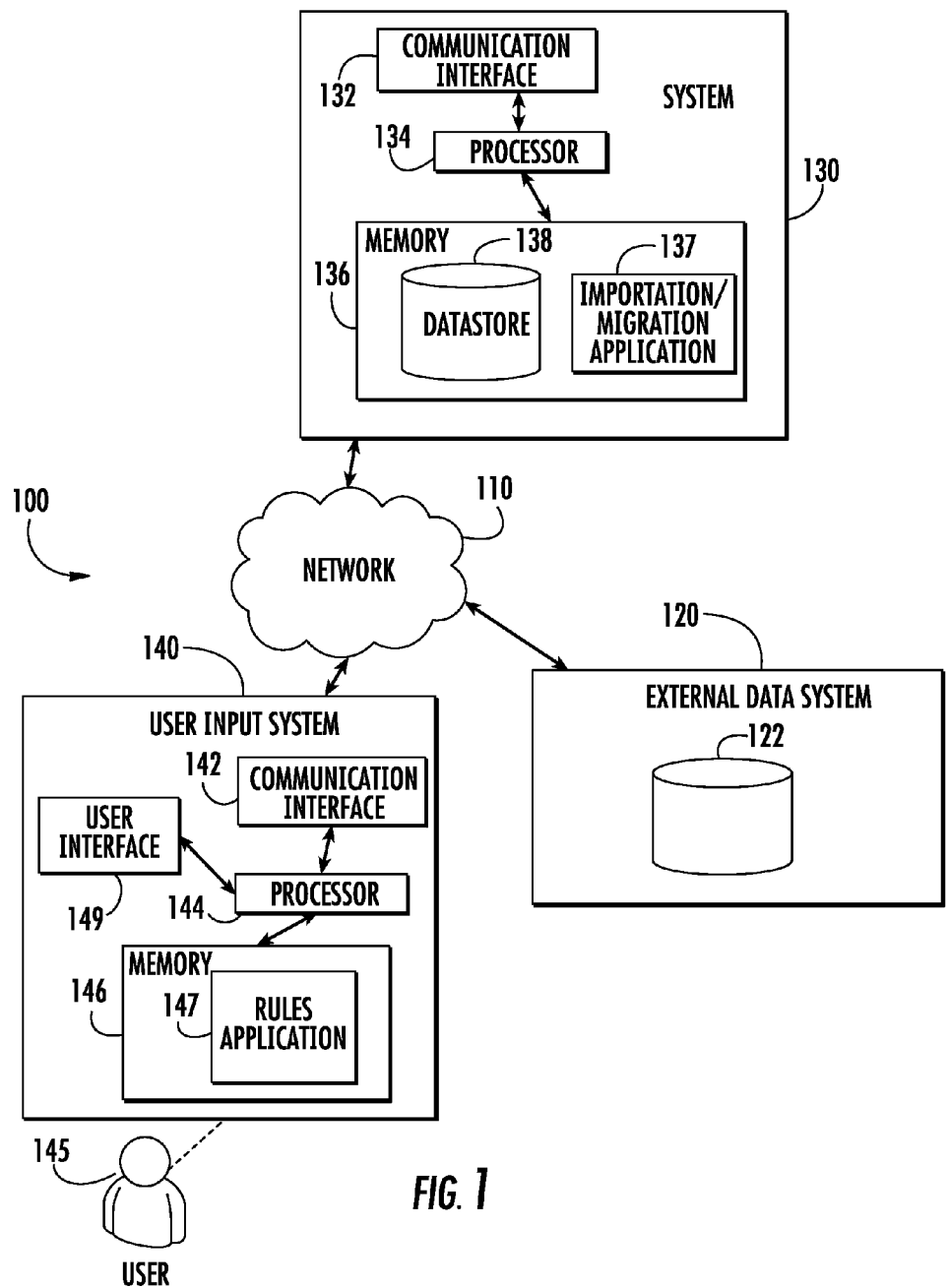
Figure 2:
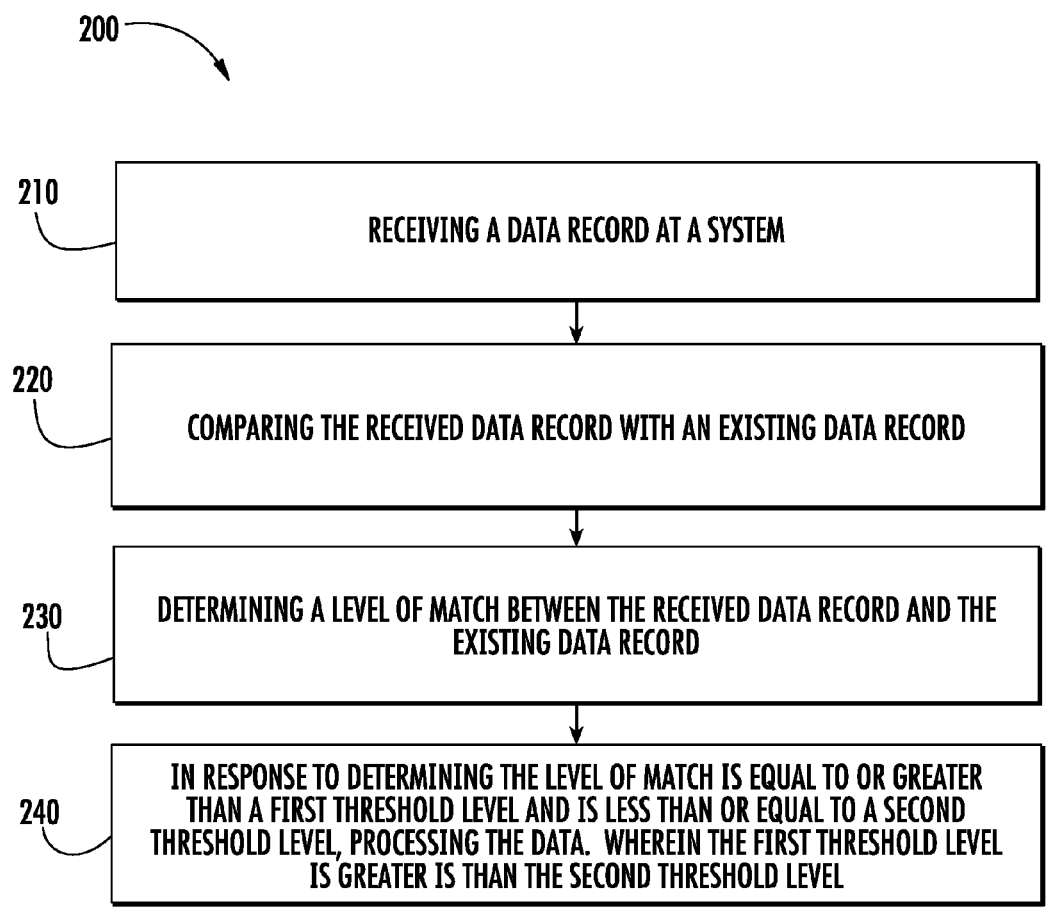

Having thus described embodiments of the invention in general terms, reference will now be made to the accompanying drawings, where:

FIG. 1 is an exemplary block diagram of the system environment for data integration, in accordance with embodiments of the present invention;

FIG. 2 is an exemplary process flow for data integration, in accordance with embodiments of the present invention;

Figure 3:
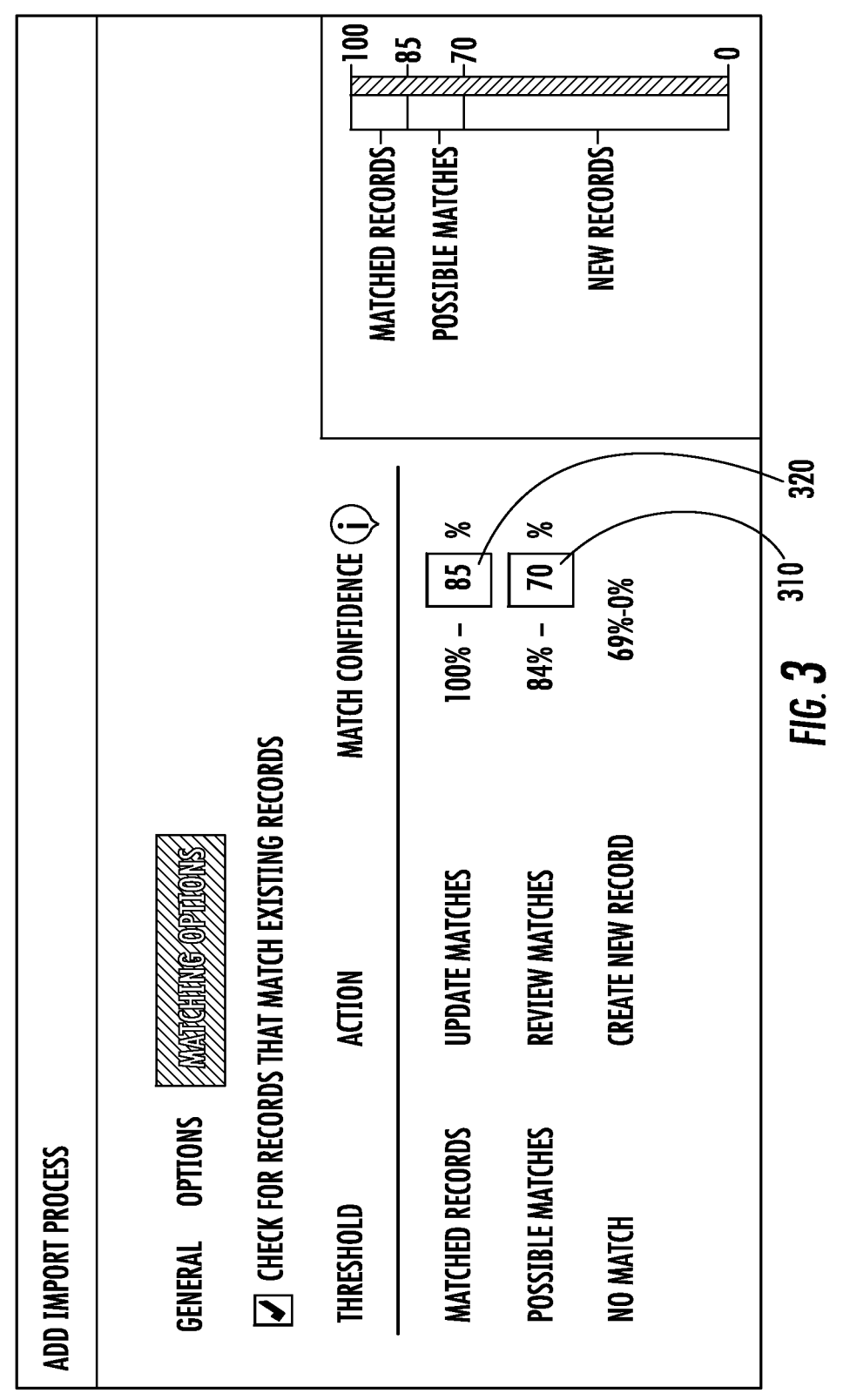

FIG. 3 is an exemplary user interface for selecting threshold levels, in accordance with embodiments of the present invention; and FIGS. 4-7 are exemplary user interfaces for reviewing incoming data records, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

When a first organization's data system imports data records from a second organization's data system, the imported data records may need to be integrated with pre-existing data records associated with the first organization. As indicated previously, there is a need for an importation system that receives the imported data records and selectively integrates the imported data records with the pre-existing or existing data records. Therefore, embodiments of the invention are directed to data integration. An exemplary method of the invention comprises receiving a data record at a system, comparing the received data record with an existing data record, determining a level of match between the received data record and the existing data record, and in response to determining the level of match is equal to or greater than a first threshold level and is less than or equal to a second threshold level, processing the data, wherein the second threshold level is greater is than the first threshold level.

As used herein, an organization may refer to an entity such as a for-profit entity or a non-profit entity. When the organization is a non-profit entity, data records include data regarding participants (people or organizations) that participate in various programs (e.g., charitable donation programs) organized by the non-profit entity. For example, a data record regarding a person may include the person's name, contact information, participation history, demographic data, etc. In some embodiments, a data record may comprise at least one field. For example, a data record regarding a person comprises at least one of a first name field, a last name field, an age field, a mailing address field (e.g., a city field, a state field, a ZIP field, etc.), an email address field, a phone number field, a participation history field, etc. In some embodiments, the data record comprises at least one of data voluntarily contributed by the user or data received by the system from at least one external data system. The user may or may not have voluntarily contributed data to the at least one external data system.

As used herein, the terms "data" and "data record" may be used interchangeably. Additionally, in some embodiments, data may comprise data records, while in other embodiments, data records may comprise data. As used herein, the terms "entity" and "organization" may be used interchangeably. As used herein, the terms "updating" and "overwriting" may be used interchangeably.

The present invention includes the steps of providing a preexisting data source (PED). As used herein, PED may refer to preexisting data, a preexisting data record, or multiple preexisting data records. As used herein, the terms "preexisting" and "existing" are equivalent. The system receives incoming data (ID). As used herein, ID may refer to incoming data, an incoming data record, or multiple incoming data records. In some embodiments, the ID may have a different file format from the PED. The file formats for the ID and the PED may be either compatible or incompatible with each other. As used herein, a file format may also be referred to as a recording format. In some embodiments, if the ID and PED are incompatible with each other, the system may process the ID such that the ID and PED have the same or compatible file format.

Subsequently, the system compares at least a portion of the ID with the PED. Based upon the comparison, the system determines the extent of the match of the portion of the ID with the PED. In one embodiment, the extent of the match can be classified as at least one of an exact match, a possible match, or a 'no match.' In some embodiments, the extent of the match can be represented as a numerical score (e.g., a score between 0 and 100, where 0 represents a 'no match' and 100 represents a perfect match). In some embodiments, the match is classified as an exact match if the system determines that the extent of the match is equal to or greater than a second predetermined threshold level of statistical confidence. In some embodiments, the match is classified as a possible match if the system determines that the extent of the match is equal to or greater a first predetermined threshold level of statistical confidence, where the second predetermined threshold is greater than the first predetermined threshold. In some embodiments, the match is classified as a 'no match' if the system determines that the extent of the match is less than the first predetermined threshold level of statistical confidence. Based upon this process, the data will fall along a scale of a perfect match to a 'no match.' Each score or threshold level described herein is associated with a predetermined degree of statistical confidence.

In some embodiments, the comparison method can be described as follows. In order to save computing resources and capacity, a select number of fields (but not all the fields) of the ID are compared to a select number of fields (but not all the fields) of the PED. In other embodiments, all the fields of the ID may be compared to all the fields of the PED. In still other embodiments, the system may determine the number of fields in the ID, and in response to determining the number of fields in the ID is less than or equal to a predetermined number of fields, the system may compare all the fields in the ID with all the fields in the PED. Subsequently, data associated with a selected field in the ID is compared with data associated with a selected field in the PED, where the system has previously determined that the selected field in the ID is substantially similar to the selected field in the PED. A result associated with the comparison of each field is assigned a score. The score associated with each field is added to produce a total score, and the total score is divided by the highest available total match score. This results in a percentage level of match score.

Depending on the nature of the organization importing the data and the sensitivity of the organization to the accuracy of the data, the organization can determine what threshold or level of match is necessary in order for the data to be retained for further processing. Any data not meeting the required threshold can then be determined as a 'no match.' As explained herein, when the level of match is determined as a 'no match,' the data in the ID is used to create a new record in a database comprising the PED. For example, the organization may establish the threshold level of match at 30%. Based on this established threshold, if the system compares the ID with the PED, and determines that the level of match is equal to or greater than 30%, the system retains the data for further processing. If the system determines the level of match is less than 30%, the system uses the data to create a new data record.

Using a system with a single threshold may cause inclusion of data that should have been rejected, but has been retained, and exclusion of data that should have been retained, but has been rejected. This is because a single threshold system causes too much manual review of data (possible matches) or creation of too many duplicate data records ('not a match' records that are duplicates of pre-existing data records). Erroneously retained or rejected data reduces data hygiene, which reflects in added cost to the organization. For instance, an organization that uses the imported data for marketing purposes, may incur increased costs in sending out mailers and making phone calls, or increased administrative costs in the handling of the erroneously retained data. On the other hand, rejected data that includes accurate and viable records can result in missed revenue for the organization. As a result of these issues, additional embodiments of the system are directed to evaluating the viability of imported data to reduce the inclusion of bad data and increase the inclusion of good data.

Therefore, embodiments of the invention improve the viability of imported data by the inclusion of at least one additional threshold either above, below, or both above and below the initial threshold. For exemplary purposes, assume that the second threshold level of match (e.g., 80%) is greater than the first initial threshold level of match (e.g., 75%). Therefore, a system described herein tags or retains data that falls between the first and second threshold for additional processing (e.g., when the level of match is equal to or greater than the first threshold, and when the level of match is less than or equal to the second threshold). In one embodiment, the additional processing of the ID includes highlighting the differences and similarities between the ID and the PED. In some embodiments, for a data record that falls between the first and second thresholds, the system initiates presentation of these differences and similarities on a user interface of a computing system associated with a user. In some embodiments, the ID may be determined to be a possible match to multiple PEDs. In such embodiments, the system initiates presentation of differences and similarities between the ID and the multiple PEDs on a user interface of a computing system associated with the user. The differences and similarities may be associated with one or more of the fields described herein. The user interface additionally presents the user with an option of at least one of: retaining the PED and at least one of ignoring the ID or importing the ID as a new data record, modifying the PED using data comprised in the ID, or overwriting the PED with data comprised in the ID. In embodiments where the user decides to modify the PED using data comprised in the ID, the user interface allows the user to determine which fields in the PED will be retained without modification, which fields in the PED will be overwritten (or at least partially modified) with data comprised in the ID, which fields in the ID will be appended to the PED as new fields, and which fields in the ID will be appended to the PED as secondary fields.

In some embodiments, the system imports the data (e.g., creates a new data record) if the level of match is equal to or less than the first threshold level. In some embodiments, the system determines that the ID and the PED comprise the same data if the level of match is equal to or greater than the second threshold level. In such embodiments, a new data record may not be created for the ID in order to prevent duplication of data records. As explained below, in some embodiments, the ID may be updated with the PED. Additionally, linking information comprised in the ID may be appended to the PED. For example, the ID comprises information that a particular data record is the incoming data record's (the ID) child. If the PED did not previously comprise this linking information, the system updates the PED so that the PED now comprises this linking information.

In some embodiments, a user or administrator of the system may select at least one of the first or second thresholds described herein when configuring the system (e.g., when configuring the system to receive the ID). The user may select at least one of the first or second thresholds based at least partially on characteristics associated with at least one of the ID, the PED, or the system. Exemplary characteristics include the size of the ID or PED (e.g., the number of data records), the type of data records comprised in the ID or PED, the amount of system time available for processing, the system processing resources or processing capacity available for executing the processes described herein, etc. The basis on which the user selects the first or second threshold is not limited to the bases described herein and may include other bases not described herein.

Based on the processing step, the system determines whether the ID and the PED comprise the same data (e.g., the ID and the PED are the same data record) and, if so, what additional processing steps to undertake. These additional processing steps may be executed regardless of the level of match between the ID and the PED. Therefore, the additional processing steps may be executed when the level of match between the ID and the PED is less than the first threshold, or falls between the first and second thresholds, or is greater than the second threshold. In some embodiments, the additional processing steps may be executed only when the level of match between the ID and the PED is greater than or equal to the first threshold and is lesser than or equal to the second threshold.

The additional processing steps may comprise one or more steps. In one embodiment, the PED is updated with the ID (e.g., the data in the PED is overwritten with the data in the ID). In another embodiment, the ID is ignored in favor of the PED (e.g., some or all of the data in the PED is retained). In still another embodiment both the PED and the ID are retained (e.g., a new record is created for the PED while leaving the ID unchanged, or the data in the PED is retained while data in the ID is appended to the data in the PED).

In still another embodiment, the ID and the PED can be compared on a field by field basis and a determination can be made whether to retain the PED, modify or overwrite the PED with the ID or retain both the PED and the ID. As used herein, a field (e.g., a first name field) is associated with data (e.g., a first name). In some embodiments, the PED is updated with any new fields contained in the ID, without overwriting any fields in the PED. In other embodiments, if the system determines that a field in the ID substantially matches a field in the PED, the data associated with the field in the PED is retained and data associated with the field in the ID is ignored.

In alternate embodiments, if the system determines that a field in the ID substantially matches a field in the PED, the data associated with the field in the PED is overwritten with data associated with the field in the ID. In other alternate embodiments, if the system determines that a field in the ID substantially matches a field in the PED, the data associated with the field in the PED is retained and data associated with the field in the ID is appended (e.g., as secondary data) to the data associated with the field in the PED. In other alternate embodiments, if the system determines that a field in the ID substantially matches a field in the PED, at least a portion of the data associated with the field in the PED is modified using data associated with the substantially matching field in the ID.

In additional or alternate embodiments, if the system determines that a field in the ID does not substantially match a field in the PED, the system may create a new field for the PED, and append the data associated with that field in the ID to the new field in the PED. In still another embodiment, one or more preexisting rules are used to filter the data based upon the requirements of each field, and the application of such rules results in the retention, modification or overwriting of the PED.

Embodiments of the present invention provide additional functionality to be used in evaluating the similarities between the ID and the PED when such data comprises an individual's name. In one embodiment, the system compares the first name in the ID with the first name in the PED and, in the event a match is not found, also compares the first name in the ID to known nicknames for the first name in the PED. In an alternate embodiment, the system compares the first name of the ID with the first name of the PED and, in the event a match is not found, compares the first name in the ID with names that are considered similar to the first name in the PED (e.g., Lee may be considered similar to Li or Le, Allen may be considered similar to Allan or Alan, etc.). This functionality is advantageous because matches for nicknames and/or similar names will increase the number and/or score of matching records and will enable the system to be more discriminating against records that have matching last names but not matching first names, thereby reducing the number of false positives.

In an alternate embodiment, the system includes a method of managing the comparison of last names to take into account life-changing events, e.g., people changing their name because of a marriage or divorce so that a different last name is not grounds for rejection of a data record. Therefore, upon identifying a life changing event, the system may conduct further processing on the record. In some embodiments, the system identifies a life-changing event if the person affected by the life changing event voluntarily submits information regarding the life changing event to the system. In other embodiments, the system identifies a life-changing event associated with a person when the system receives information from an external system. For example, in one embodiment, where a charitable organization identifies a donor that has undergone a life-changing event involving a divorce, the system can evaluate the PED to determine what data and/or fields should be associated with the donor's data record on at least one of a forward-going or retroactive basis, and to determine whether any of the data and/or fields associated with the donor's data record should be changed or deleted. For example, data and/or fields that may need to changed or deleted include household data, revenue data, tax data, etc. For instance, one spouse may be primarily responsible for payment of bills (e.g., a mortgage bill payment, credit card bill payment, etc.) such that the prior revenue records (e.g., household revenue records) should be associated with such spouse and not the other spouse in the event of a divorce.

As explained previously, the system described herein can import data from an external system. Additionally, the system described herein can migrate data to another system, application, database, etc. Embodiments of the invention are also directed to managing imported and/or migrated data by providing an initial user interface that enables the user to apply rules to the migrated or imported data. In one embodiment, the user interface is used to establish a set of applicable rules for a single data migration or importation. In another embodiment, the user interface is used to establish applicable rules for multiple consecutive or non-consecutive data migrations and/or importations. The rules configured through the user interface can vary from data file to data file and/or from organization to organization based upon the nature of the data being migrated or imported.

For example, one or more rules may be utilized to assist in managing data hygiene (e.g., increasing good data, reducing bad data, etc.). As a further example, one or more rules may be utilized for matching the imported data (or migrated data) with the pre-existing data. As a further example, one or more rules may be utilized to standardize the format of the imported data such that the imported data (or migrated data) is compatible with the pre-existing data (or with a new application or database or system). As a further example, in an embodiment where the importer of the data is a non-profit organization that collects donations, one or more rules may be utilized for managing different or new types of donations from a donor. The one or more rules applicable herein may be data hygiene rules, revenue application rules, etc.

In another embodiment, the rules can be configured to assist in mapping the data being imported. As used herein, data mapping is a process in which a link (e.g., one or more integration rules) between multiple distinct data sets is defined. Once the link is defined, the multiple distinct data sets may be integrated into a single data set. For example, a software application is provided that reads a header file associated with imported data to infer mapping from the imported data, where the imported data may be received from an external system that may or may not have previously transmitted data to the system described herein. In this embodiment, the header file can be interrogated or read by the system in order to ascertain the types of data being imported and/or mapping instructions so that such data can be mapped to the appropriate database(s) (destination of data integration) or so that such data can be mapped appropriately to a database (method of data integration). In some embodiments, the system uses the mapping instructions to map the imported data to the appropriate database(s) or to appropriately map the imported data to a database. In other embodiments, the system generates the mapping instructions based on identifying the types of data being imported, and uses the generated mapping instructions to map the imported data to the appropriate database(s) or to appropriately map the imported data to a database. In some embodiments, this information regarding the header file is saved for each corresponding external system (e.g., vendor system) that transmits data to the system described herein. The data mapping method described herein may be executed prior to executing the data integration method described herein.

Therefore, in one embodiment, when imported data is received from a data source (e.g., a vendor system), the system will first determine the identity of the source by reading or interrogating the header file associated with the imported data. The invention is not limited to this method of identifying the source of imported data. In other embodiments, the system may identify the source of imported data without reading or interrogating the header file, e.g., the system may identify the source of imported data by extracting one or more attributes associated with the imported data.

The system then interrogates or queries a database (either stored in the system or stored outside the system but accessible by the system) comprising a list of existing sources to determine if the source comprises an existing source. As used herein, an existing source is a source from which the system previously imported (either directly or indirectly) data within a predetermined period in the past. The system directly imported data from another system if the system directly imported the data from the other system without transmission or reception by any intervening systems. The system indirectly imported data from another system if the system imported the data from the other system via one or more other intervening systems.

If the source comprises an existing source, the system will retrieve the corresponding mapping information associated with the source from either an internal or external database accessible by the system (e.g., a database that is either the same as or different from the database comprising the list of existing source). Using the retrieved information, the system ascertains the type of data being imported and/or mapping instructions for the data and maps the imported data to the appropriate database(s). If the source of the imported data is not an existing source, then the system will interrogate or read the header file and attempt to identify the types of data being imported and/or mapping instructions for the imported data. The data mapping method described herein may be executed when the system is being configured to import data (e.g., the ID) from a data source. Therefore, in some embodiments, the data mapping method is executed prior to executing the data integration method.

As used herein, importing or integrating comprises importing or receiving new data (e.g., from an external data system), migrating (or transmitting) existing data into a new application or database or system, or manually inputting data via an input system. The invention is not limited to any particular input system for manual input of data. The invention is not limited to any particular transmission mechanism (e.g., wired and/or wireless transmission) by which the system described herein receives (imports) or transmits (migrates or exports) data.

Referring now to FIG. 1, FIG. 1 presents an exemplary block diagram of the system environment 100 for performing data integration, in accordance with embodiments of the present invention. As illustrated, the system environment 100 includes a network 110, an external data system 120, a system 130 (may also be referred to as an integration system), and a user input system 140. Also shown in FIG. 1 is a user 145 of the user input system 140.

As shown in FIG. 1, the external data system 120, the system 130, and the user input system 140 are each operatively and selectively connected to the network 110, which may include one or more separate networks. In addition, the network 110 may include a local area network (LAN), a wide area network (WAN), and/or a global area network (GAN), such as the Internet. It will also be understood that the network 110 may be secure and/or unsecure and may also include wireless and/or wireline and/or optical interconnection technology.

The external data system 120 may be any computing or non-computing system that transmits data to the system 130. Additionally or alternatively, data from the system 130 may be transmitted or migrated to the external data system 120. As presented in FIG. 1, the external data system 120 comprises at least one datastore 122.

The user input system 140 may include any computerized apparatus that can be configured to perform any one or more of the functions of the user input system 140 described and/or contemplated herein. For example, the user 145 may use the user input system 140 to transmit data to the system 130. In some embodiments, for example, the user input system 140 may include a personal computer system, a mobile computing device, a personal digital assistant, a network device, and/or the like. As illustrated in FIG. 1, in accordance with some embodiments of the present invention, the user input system 140 includes a communication interface 142, a processor 144, a memory 146 having a rules application 147 stored therein, and a user interface 149. In such embodiments, the communication interface 142 is operatively and selectively connected to the processor 144, which is operatively and selectively connected to the user interface 149 and the memory 146. In some embodiments, the user 145 may use the rules application 147 to establish rules associated with the importation or migration or integration of data as described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a modem, server, electrical connection, and/or other electronic device that operatively connects the user input system 140 to another system such as the system 130.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the rules application 147 of the memory 146 of the user input system 140.

Each memory device described herein, including the memory 146 for storing the rules application 147 and other data, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 1, the memory 146 includes the rules application 147. In some embodiments, the rules application 147 includes an interface for communicating with, navigating, controlling, configuring, and/or using at least one of the system 130 or the user input system 140. In some embodiments, the rules application 147 includes computer-executable program code portions for instructing the processor 144 to perform one or more of the functions of the rules application 147 described and/or contemplated herein. In some embodiments, the rules application 147 may include and/or use one or more network and/or system communication protocols.

Also shown in FIG. 1 is the user interface 149. In some embodiments, the user interface 149 includes one or more user output devices, such as a display and/or speaker, for presenting information to the user 145 and/or some other user. In some embodiments, the user interface 149 includes one or more user input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 145 and/or some other user. In some embodiments, the user interface 149 includes the input and display devices of a personal computer, such as a keyboard and monitor, which are operable to receive and display information.

FIG. 1 also illustrates a system 130, in accordance with an embodiment of the present invention. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. In some embodiments, such as the one illustrated in FIG. 1, the system 130 includes a communication interface 132, a processor 134, and a memory 136, which includes an importation or integration application 137 and a datastore 138 stored therein. As shown, the communication interface 132 is operatively and selectively connected to the processor 134, which is operatively and selectively connected to the memory 136. The importation application 137 may perform functions associated with at least one of importation, migration, or integration of data. Therefore, the importation application 137 may also be referred to as the migration application or the integration application.

It will be understood that the importation application 137 may be configured to implement any one or more portions of process flow 200 described and/or contemplated herein. It will also be understood that, in some embodiments, the memory includes other applications. It will also be understood that, in some embodiments, the importation application 137 is configured to communicate with the datastore 138, the user input system 140 and/or the external data system 120.

It will be further understood that, in some embodiments, the importation application 137 includes computer-executable program code portions for instructing the processor 134 to perform any one or more of the functions of the importation application 137 described and/or contemplated herein. In some embodiments, the importation application 137 may include and/or use one or more network and/or system communication protocols.

In addition to the importation application 137, the memory 136 also includes the datastore 138. As used herein, the datastore 138 may be one or more distinct and/or remote datastores. In some embodiments, the datastore 138 is not located within the system and is instead located remotely from the system. In some embodiments, the datastore 138 stores information or data described herein. For example, the datastore 138 stores the pre-existing data records described herein. As a further example, the datastore 138 stores a list of existing data sources described herein.

It will be understood that the datastore 138 may include any one or more storage devices, including, but not limited to, datastores, databases, and/or any of the other storage devices typically associated with a computer system. It will also be understood that the datastore 138 may store information in any known way, such as, for example, by using one or more computer codes and/or languages, alphanumeric character strings, data sets, figures, tables, charts, links, documents, and/or the like. Further, in some embodiments, the datastore 138 may include information associated with one or more applications, such as, for example, the importation application 137. It will also be understood that, in some embodiments, the datastore 138 provides a substantially real-time representation of the information stored therein, so that, for example, when the processor 134 accesses the datastore 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. For example, the system 130 and the external data system 120 may be maintained by separate parties.

It will also be understood that the system 130 may include and/or implement any embodiment of the present invention described and/or contemplated herein. For example, in some embodiments, the system 130 is configured to implement any one or more of the embodiments of the process flow 200 described and/or contemplated herein in connection with FIG. 2.

Referring now to FIG. 2, FIG. 2 is an exemplary process flow 200 for performing data integration, in accordance with embodiments of the present invention. In some embodiments, the process flow may include less or more steps than those presented in FIG. 2. Additionally, the steps of the process flow may be performed in an order different from that presented in FIG. 2. At block 210, the process flow comprises receiving a data record at a system. In some embodiments, prior to performing the comparing step at block 220, the system performs the data mapping method described herein. For example, the data mapping method comprises reading a header associated with the received data record, wherein the header comprises information regarding at least one of a data type associated with the received data record or at least one instruction associated with mapping the received data record. Additionally or alternatively, in some embodiments, the data mapping method comprises determining a source associated with the received data record; accessing a list of sources to determine whether the system previously received a data record from the source; and in response to determining the system previously received a data record from the source, retrieving at least one mapping instruction from a database accessible to the system.

At block 220, the process flow comprises comparing the received data record with an existing data record. At block 230, the process flow comprises determining a level of match between the received data record and the existing data record. At block 240, the process flow comprises in response to determining the level of match is equal to or greater than a first threshold level and is less than or equal to a second threshold level, processing the received data record, wherein the second threshold level is greater is than the first threshold level.

Referring now to FIG. 3, FIG. 3 presents an exemplary user interface for selecting threshold levels, in accordance with embodiments of the present invention. As presented in FIG. 3, a user can define the first 310 and second 320 threshold levels described herein. In some embodiments as described herein, when the level of match falls between the first 310 and second 320 threshold levels, the ID is flagged for additional processing. In some embodiments, the additional processing may be automatically executed by the system described herein. In other embodiments, the additional processing may be performed by a user of the system.

Referring now to FIGS. 4-7, FIGS. 4-7 present exemplary user interfaces for reviewing incoming data records, in accordance with embodiments of the present invention. In some embodiments, the user interfaces are presented when the level of match between the ID and the PED falls between the first and second threshold levels. Sometimes, the user interfaces are presented even when the level of match is greater than the second threshold or when the level of match is lesser than the first threshold. The record titled "Jane Louise Doe" 410 is an incoming data record (ID). The user interface presents two possible matching existing data records (PEDs) 420 and 430. The level of match associated with both PEDs 420 and 430 falls between the first and second threshold levels established in FIG. 3. Additionally, the user interface presents the PED 420 associated with the best possible level of match (83%). As indicated in FIG. 4, the data comprised in the PED is at least partially different from the data comprised in the ID. Additionally, a user can switch between the potential matches in the PED by clicking on the tab associated with each potential match. When the user clicks on an appropriate tab, that data record (in the PED) appears in the middle column of the user interface. Additionally, as presented in FIG. 4, the user interface indicates to the user the differences between the ID and the PED. The differences are indicated by a square symbol 470 that is presented on the left-hand side of the user interface.

The user interface also presents a "Add this as new record" option 440 and a "Confirm this record as a match" 450 option. When the user selects the "Add this as new record" option 440, the ID is added as a new record in the database that comprises the PED. When the user selects the "Confirm this record as a match" option 450, the PED is selectively updated with data comprised in the ID. Additionally, a user can choose a 'Skip' option 460 if the user wishes to return to managing the data records at a later point in time.

FIG. 5 presents a user interface when the user selects the "Add this as new record" option on the user interface presented in FIG. 4. When the user selects this option, the ID 510 is added as a new record in the database that comprises the PED. The user interface indicates to the user that the user has chosen to create a new record ("You have chosen to create a new constituent record" 530). Additionally, the user interface presents a "Don't add this as a new record" option 520. If the user selects this option, the adding of the ID as a new record is undone and the user interface of FIG. 4 is re-presented to the user. Alternatively, the user may select a "Save" option 550 to save the new record in the database that comprises the PED. Additionally, the user may or may not select an option to "Automatically go to the next duplicate exception" 540. When this option is selected, after the user selects the "Save" option, the user is taken to the next ID where the level of match falls between the first and second thresholds.

FIG. 6 presents a user interface resulting from the user's selection of the "Confirm this record as a match" option in FIG. 4. Prior to selecting the "Confirm this record as a match" option in FIG. 4, the user may select a customizable option for each field in the ID and/or the PED. When data associated with a particular field is comprised in both the ID and the PED, the user is presented with an "Ignore" option 610 and a "Replace" option 620. When the user chooses the "Ignore" option 610, the data associated with a particular field in the PED is not replaced with data associated with a substantially matching field in the ID. When the user chooses the "Replace" option 620, the data associated with a particular field in the PED is replaced with data associated with a substantially matching field in the ID. Examples of such fields in FIG. 6 are the first name field, the last name field, the address field, the email address field, and the phone number field.

When data associated with a particular field is comprised in the ID but not comprised in the PED, the user is presented with an "Ignore" option 630 and an "Add" option 640. Examples of such fields in FIG. 6 are the middle name field and the date of birth field. When the user chooses the "Ignore" option 630, the empty field in the PED is not filled with data associated with a substantially matching field in the ID. When the user chooses the "Add" option 640, the empty field in the PED is filled with data associated with a substantially matching field in the ID. In embodiments where the user chooses the "Add" option 640 and where the PED does not comprise a field substantially corresponding to a field in the ID, a new field is created in the PED and is filled with data associated with the corresponding field in the ID.

In some embodiments, when the data associated with a particular field is comprised in both the ID and the PED, the user is presented with an "Add as secondary" option 650. When the user chooses the "Add as secondary" option 650, the data associated with a particular field in the PED is not replaced with data associated with a substantially matching field in the ID. Instead, the data associated with the substantially matching field in the ID is appended to the PED as secondary data. Therefore, for example, if the "Add as secondary" option 650 is chosen for the email address (or the phone number or the address) in the ID, the email address in the ID is appended as a secondary email address to the PED. The primary email address in the PED remains unchanged. For the name field in the PED, the "Add as secondary" option may be presented as an "Add as an alias" option 660.

For example, for the name field in the ID, the user can choose the options of "Add as an alias," 660 "Ignore," 670 or "Replace" 680. If the user chooses the "Add as an alias" option 660, the name (comprising the first name, the middle name, and the last name) in the ID is added as an alias in the PED (the name in the PED is retained and is not replaced with the name in ID). If the user chooses the "Ignore" option 670, the name in the PED is retained while the name in the ID is ignored. If the user chooses the "Replace" option 680, the name in the PED is replaced with the name in the ID.

If the user wants to undo the updating of the PED, the user may select the option "This record is not a match" 690. When the user selects this option, the original data comprised in the PED is retained, and any updates may be erased or undone.

FIG. 7 presents a user interface resulting from the user selecting one or more options for each field in FIG. 6. As indicated in FIG. 7, the user selected the "Add as an alias" option for the name field (comprising the first name, the middle name, and the last name). The user interface indicates to the user ("Adding as an alias" 710) that the name in the ID is being added as an alias to the PED. The user interface presents the user with an "Undo" option 720 if the user wants to undo adding the name in the ID as an alias to the name in the PED. Additionally, the user interface indicates that the user selected to add the date of birth in the ID to the empty date of birth field in the PED. Additionally, the user interface indicates that the user chose to add the email address (and phone number) in the ID as a secondary email address (and phone number) to the primary email address (and phone number) in the PED.

Additionally, the user interface indicates that the user ignored the address in the ID. Since the user ignored the address in the ID, the original address in the PED is retained. Additionally, the differences associated with the address in the ID are crossed-through 730 indicating to the user that the user has ignored the crossed-through portions of the address in the ID.

In some embodiments, if the user does not select an "Ignore," "Add," "Replace," or "Add as secondary" option in FIG. 6, the system may automatically choose the "Ignore" option. Alternatively, the system may automatically determine, using one or more predetermined algorithms, which of the options is most appropriate for a particular field under consideration and select the determined option.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

In some embodiments, the methods described herein may be automatically configured to run periodically. As used herein, the term "automatic" refers to a function, a process, a method, or any part thereof, which is executed by computer software upon occurrence of an event or a condition without intervention by a user.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A data integration method comprising:
    receiving a data record at a system;
    comparing the received data record with an existing data record;
    determining a level of match between the received data record and the existing data record, in response to determining the level of match is less than a first threshold, creating a new data record in the system that comprises data in the received data record;
    in response to determining the level of match is greater that a second threshold, forgoing creating the new data record based on the existing data record comprising same data as the received data record; and
    in response to determining the level of match is equal to or greater than the first threshold level and is less than or equal to the second threshold level, processing the received data record, wherein the second threshold level is greater than the first threshold level, wherein the processing step comprises presenting, on a user interface, at least one difference and at least one similarity between entries in at least one field of the received data record and entries in at least one field of the existing data record.

2. The method of claim 1, wherein the received data record comprises data associated with at least one data field.

3. The method of claim 1, further comprising in response to determining the level of match is greater than the second threshold level, determining the received data record and the existing data record are associated with the same person or entity.

4. The method of claim 3, wherein the determining whether the received data record and the existing data record are associated with the same person or entity further comprises at least one of:
    determining whether a first name in the received data record matches a first name in the existing data record,
    determining whether a first name in the received data record matches a nickname associated with the first name in the existing data record, or
    determining whether a first name in the received data record matches an alternate first name in the existing data record, wherein the alternate first name is similar to or analogous to, but not the same as, the first name.

5. The method of claim 3, wherein the determining whether the received data record and the existing data record are associated with the same person or entity further comprises:
   determining whether a last name in the received data record matches a last name in the existing data record, and
   in response to determining the last name in the received data record does not match the last name in the existing data record, determining whether a person associated with the existing data record has experienced a life-changing event, wherein the life-changing event caused a change to the person's last name.

6. The method of claim 1, wherein the processing step comprises at least one of:
   updating the existing data record with data comprised in the received data record,
   retaining the existing data record without updating the existing data record with data comprised in the received data record,
   integrating the received data record into a database comprising the existing data record without updating the existing data record with data comprised in the received data record, or
   appending as secondary data into the existing data record, data comprised in the received data record.

7. The method of claim 6, wherein the updating step comprises:
   determining whether the received data record comprises data associated with a data field comprised in the existing data record; and
   in response to determining the received data record comprises data associated with a data field comprised in the existing data record, updating the existing data record with data comprised in the received data record.

8. The method of claim 1, wherein the processing step comprises:
   determining whether the received data record comprises data associated with a data field not comprised in the existing data record; and
   in response to determining the received data record comprises data associated with a data field not comprised in the existing data record, integrating, into the existing data record, data associated with the data field not comprised in the existing data record.

9. The method of claim 1, wherein the processing step comprises:
   comparing a data field associated with the received data record with a data field associated with the existing data record; and
   for data associated with each data field, performing, based at least partially on at least one rule associated with each data field, at least one of:
   updating data comprised in the existing data record with data comprised in the received data record,
   retaining the data comprised in the existing data record without updating the data comprised in the existing data record with the data comprised in the received data record,
   integrating the data comprised in the received data record into the existing data record without erasing the data comprised in the existing data record, or
   appending as secondary data into the existing data record, data comprised in the received data record.

10. The method of claim 1, wherein a user of the system determines at least one of the first threshold or the second threshold based at least partially on at least one of the received data record, the existing data record, or an attribute of the system.

11. The method of claim 1, wherein a recording format associated with the received data record is different from a recording format associated with the existing data record.

12. The method of claim 11, further comprising:
   prior to performing the comparing step, processing the received data record such that the recording format associated with the received data record is substantially compatible with the recording format associated with the existing data record.

13. The method of claim 1, further comprising enabling a user to define at least one rule to perform at least one of the comparing, determining, or processing steps.

14. The method of claim 1, further comprising:
   reading a header associated with the received data record, wherein the header comprises information regarding at least one of a data type associated with the received data record or at least one instruction associated with mapping the received data record.

15. The method of claim 14, further comprising:
   mapping the received data record to a database based on the reading step.

16. The method of claim 1, further comprising:
   determining a source associated with the received data record;
   accessing a list of sources to determine whether the system previously received a data record from the source; and
   in response to determining the system previously received a data record from the source, retrieving at least one mapping instruction from a database accessible to the system.

17. The method of claim 16, wherein the determining a source associated with the received data record comprises determining a source associated with the received data record based at least partially on reading a header associated with the received data record, wherein the header comprises information regarding at least one of a data type associated with the received data record or at least one instruction associated with mapping the received data record.

18. A system for performing data integration, the system comprising:
   a memory;
   a processor;
   a module stored in the memory, executable by the processor, and configured to:
   receive a data record at the system;
   compare the received data record with an existing data record;
   determine a level of match between the received data record and the existing data record;
   in response to determining the level of match is less than a first threshold, create a new data record in the system that comprises data in the received data record;
   in response to determining the level of match is greater that a second threshold, forgo creating the new data record based on the existing data record comprising same data as the received data record; and
   in response to determining the level of match is equal to or greater than the first threshold level and is less than or equal to the second threshold level, process the received data record, wherein the second threshold level is greater than the first threshold level, wherein the processing step comprises presenting at least one difference and at least one similarity between entries in at least one field of the received data record and entries in at least one field of the existing data record.

19. A computer program product for performing data integration, the computer program product comprising:
- a non-transitory computer-readable medium comprising code configured to:
- receive a data record at a system;
- compare the received data record with an existing data record;
- determine a level of match between the received data record and the existing data record;
- in response to determining the level of match is less than a first threshold, create a new data record in the system that comprises data in the received data record;
- in response to determining the level of match is greater that a second threshold, forgo creating the new data record based on the existing data record comprising same data as the received data record; and
- in response to determining the level of match is equal to or greater than the first threshold level and is less than or equal to the second threshold level, process the received data record, wherein the second threshold level is greater than the first threshold level, wherein the processing step comprises presenting at least one difference and at least one similarity between entries in at least one field of the received data record and entries in at least one field of the existing data record.

\* \* \* \* \*